US012638846B2

(12) United States Patent
Yamauchi

(10) Patent No.: US 12,638,846 B2
(45) Date of Patent: May 26, 2026

(54) AUTOMATIC TRAVELING SYSTEM, AUTOMATIC TRAVELING METHOD, AND RECORDING MEDIUM RECORDING AUTOMATIC TRAVELING PROGRAM

(71) Applicant: SHARP KABUSHIKI KAISHA, Sakai City (JP)

(72) Inventor: Hiroshi Yamauchi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 168 days.

(21) Appl. No.: 18/204,690

(22) Filed: Jun. 1, 2023

(65) Prior Publication Data

US 2023/0393576 A1     Dec. 7, 2023

(30) Foreign Application Priority Data

Jun. 2, 2022     (JP) ................................. 2022-090156

(51) Int. Cl.
G05D 1/00                (2024.01)

(52) U.S. Cl.
CPC ......... G05D 1/0212 (2013.01); G05D 1/0234 (2013.01)

(58) Field of Classification Search
CPC .... G05D 1/0212; G05D 1/0234; G05D 1/242; G05D 1/646; G05D 1/247; G05D 2105/28; G05D 2107/70; G05D 2109/10; G05D 2111/17; G05D 2111/34; G06Q 10/087; G06Q 10/08; G06Q 10/0832; G06Q 10/08355; B60P 3/007; B60P 3/00; B60P 1/00; B60P 7/10; B60P 1/6418; B60P 1/6427; B60P 1/6445; G06F 3/0484; B07C 5/36; B07C 2501/0063;

B07C 3/18; B07C 2301/0016; B65G 1/0492; B65G 1/1378; B65G 61/00; B65G 65/00; B65G 1/02; B65G 2201/025; B65G 1/1373
See application file for complete search history.

(56) References Cited

U.S. PATENT DOCUMENTS

| | | | |
|---|---|---|---|
| 2007/0276558 A1 | 11/2007 | Kim | |
| 2016/0327952 A1* | 11/2016 | Walton | ................. G05D 1/0088 |
| 2021/0163006 A1 | 6/2021 | Yasui et al. | |

FOREIGN PATENT DOCUMENTS

| | | | | |
|---|---|---|---|---|
| CN | 105739508 A | * | 7/2016 | .......... G05D 1/0259 |
| JP | 2007-531105 A | | 11/2007 | |
| JP | 2010204921 A | * | 9/2010 | |
| JP | 2019-192136 A | | 10/2019 | |

* cited by examiner

*Primary Examiner* — Rachid Bendidi
*Assistant Examiner* — Joseph Anderson Yanoska
(74) *Attorney, Agent, or Firm* — ScienBiziP, P.C.

(57)     ABSTRACT

An automatic traveling system includes: a determination processor that determines whether or not the automatic traveling device successfully reads a target tag at a position of the target tag while traveling; and a traveling processor that controls traveling of the automatic traveling device on the basis of information on a first connection route connecting an installation position of a first tag immediately before the target tag that is determined not to be successfully read to an installation position of the target tag, and a second connection route connecting an installation position of a second tag immediately after the target tag to the installation position of the target tag, in a case where the determination processor determines that the target tag is not successfully read.

6 Claims, 8 Drawing Sheets

| MOTION ORDER | TAG NUMBER | TRAVELING MOTION | SPEED (m/min) | TRAVELING DISTANCE | SPECIFIC MOTION |
|---|---|---|---|---|---|
| 1 | 2 | ADVANCE | 10 | L2 | – |
| 2 | 3 | ADVANCE | 30 | L3 | – |
| 3 | 4 | RIGHT SPIN | 20 | L4 | – |
| 4 | 5 | RIGHT SPIN | 20 | L5 | – |
| 5 | 6 | ADVANCE | 10 | L6 | – |
| 6 | 7 | STOP | 0 | L7 | CHARGING |
| 7 | 8 | RIGHT FOLLOWING | 20 | L8 | – |
| 8 | 9 | RIGHT FOLLOWING | 20 | L9 | – |
| 9 | 1 | CENTER FOLLOWING | 20 | L1 | – |
| 10 | 2 | STOP | 0 | – | PLATFORM TRUCK COUPLING |

AUTOMATIC TRAVELING SYSTEM, AUTOMATIC TRAVELING METHOD, AND RECORDING MEDIUM RECORDING AUTOMATIC TRAVELING PROGRAM

INCORPORATION BY REFERENCE

This application is based upon and claims the benefit of priority from the corresponding Japanese Patent Application No. 2022-090156 filed on Jun. 2, 2022, the entire contents of which are incorporated herein by reference.

BACKGROUND

The present disclosure relates to an automatic traveling system, an automatic traveling method, and a recording medium recording an automatic traveling program.

Conventionally, there is known a system in which an automatic traveling device receives a good to be transported at a storage location (e.g., a storage shelve) and transports the good to a delivery location (e.g., a discharge point), in such facilities as warehouses.

For example, there is known a system in which an automatic traveling device autonomously travels along a predetermined traveling route while recognizing coordinates obtained by reading a two-dimensional bar code installed on a floor.

Reading errors (skipping) may occur due to tag abnormalities caused by damage, age-related deterioration, or misalignment of tags such as two-dimensional bar codes, RFIDs, and markers that are read by the automatic traveling device, or environmental conditions when tags are read. When a tag reading error occurs, the automatic traveling device stops traveling or deviates from the traveling route, so that the transport operation is interrupted, and a problem that lowers transport efficiency is caused.

SUMMARY

An object of the present disclosure is to provide an automatic traveling system, an automatic traveling method, and a recording medium recording an automatic traveling program capable of suppressing reduction in transport efficiency by an automatic traveling device when a tag reading error occurs.

An automatic traveling system according to an aspect of the present disclosure is a system that causes an automatic traveling device to travel by sequential movement of the automatic traveling device to a position of each of a plurality of tags in a specified order and reading of each of the tags by the automatic traveling device, in a traveling area where a plurality of the tags are installed corresponding to a plurality of respective installation positions. The automatic traveling system includes a determination processor and a traveling processor. The determination processor determines whether or not the automatic traveling device successfully reads a target tag at a position of the target tag while traveling. The traveling processor controls traveling of the automatic traveling device on the basis of information on a first connection route connecting an installation position of a first tag immediately before the target tag that is determined not to be successfully read to an installation position of the target tag, and a second connection route connecting an installation position of a second tag immediately after the target tag to the installation position of the target tag, in a case where the determination circuit determines that the target tag is not successfully read.

An automatic traveling method according to another aspect of the present disclosure is a method for causing an automatic traveling device to travel by sequential movement of the automatic traveling device to a position of each of a plurality of tags in a specified order and reading of each of the tags by the automatic traveling device, in a traveling area where a plurality of the tags are installed corresponding to a plurality of respective installation positions. One or more processors determines whether or not the automatic traveling device successfully reads a target tag at a position of the target tag while traveling; and controls traveling of the automatic traveling device on the basis of information on a first connection route connecting an installation position of a first tag immediately before the target tag that is determined not to be successfully read to an installation position of the target tag, and a second connection route connecting an installation position of a second tag immediately after the target tag to the installation position of the target tag, in a case where the target tag is determined not to be successfully read.

A recording medium according to another aspect of the present disclosure is a recording medium recording a program that causes an automatic traveling device to travel by sequential movement of the automatic traveling device to a position of each of a plurality of tags in a specified order and reading of each of the tags by the automatic traveling device, in a traveling area where a plurality of the tags are installed corresponding to a plurality of respective installation positions. The program is a program for causing one or more processors to: determine whether or not the automatic traveling device successfully reads a target tag at a position of the target tag while traveling; and control traveling of the automatic traveling device on the basis of information on a first connection route connecting an installation position of a first tag immediately before the target tag that is determined not to be successfully read to an installation position of the target tag, and a second connection route connecting an installation position of a second tag immediately after the target tag to the installation position of the target tag, in a case where the target tag is determined not to be successfully read.

According to the present disclosure, it is possible to provide an automatic traveling system, an automatic traveling method, a recording medium recording an automatic traveling program capable of suppressing reduction in transport efficiency by an automatic traveling device when a tag reading error occurs.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a diagram illustrating an example of control information used by the automatic traveling system according to the embodiment of the present disclosure.

DETAILED DESCRIPTION

Figure 1:
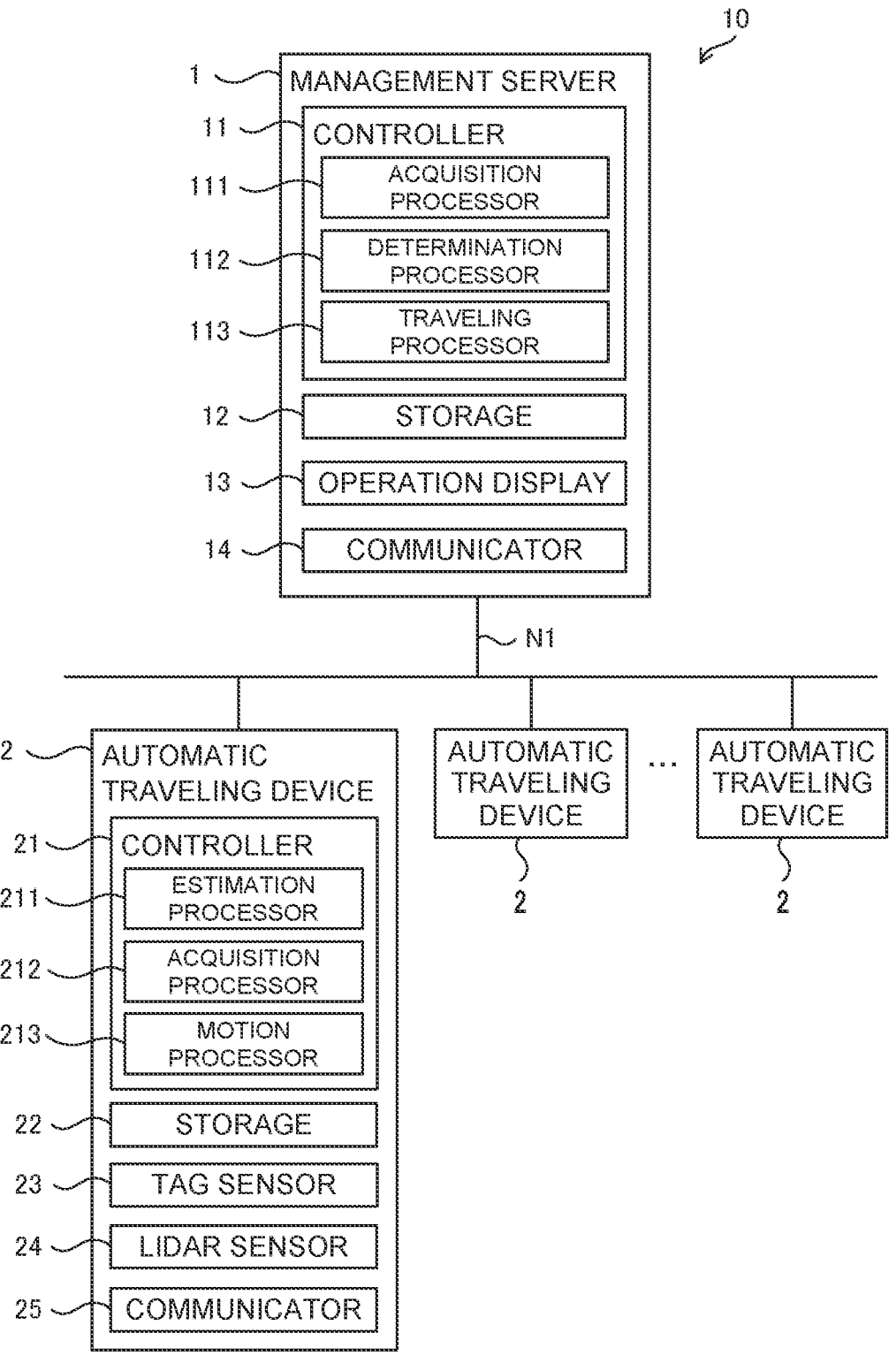
FIG. 1 is a block diagram illustrating a configuration of an automatic traveling system according to an embodiment of the present disclosure.

An embodiment of the present disclosure will be described below with reference to the accompanying drawings to facilitate understanding of the present disclosure. The following embodiment is an example in which the present disclosure is embodied, and does not limit the technical scope of the present disclosure.
Automatic Traveling System 10
As illustrated in FIG. 1, an automatic traveling system 10 according to an embodiment of the present disclosure includes a plurality of automatic traveling devices 2, and a management server 1 that manages the automatic traveling devices 2. In the present disclosure, the number of the automatic traveling devices 2 is not limited, and may be one automatic traveling device. The automatic traveling system 10 is a system that causes the automatic traveling devices 2 to travel autonomously in accordance with the traveling route. Each automatic traveling device 2 is an autonomous vehicle (AGV, also called an automated guided vehicle) that travels along a predetermined traveling route while estimating its own position. The management server 1 and the automatic traveling devices 2 can communicate with each other via a communication network N1, such as a wireless LAN.

Figure 2:
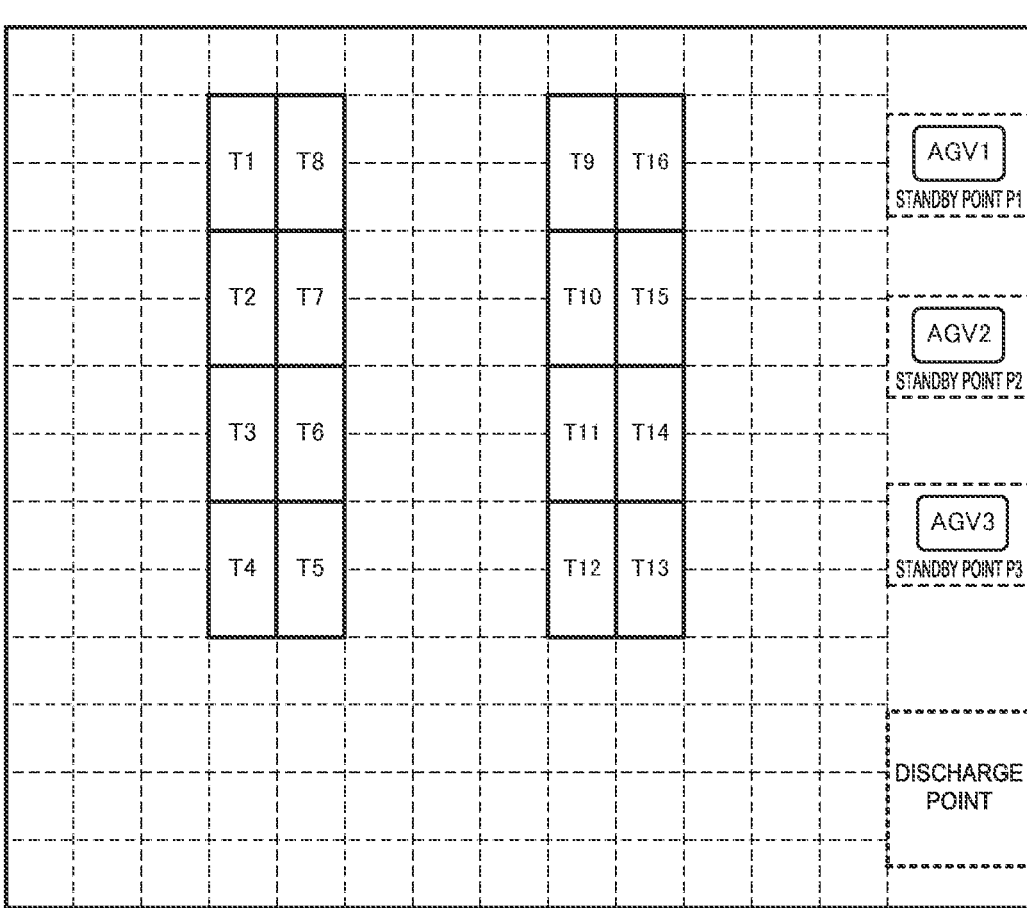
FIG. 2 is a diagram schematically illustrating a configuration of a facility to which the automatic traveling system according to the embodiment of the present disclosure is applied.

The automatic traveling system 10 is installed in a facility such as a factory and a warehouse, for example. In this embodiment, an example in which the automatic traveling system 10 is applied to a facility W1 illustrated in FIG. 2 will be described as an example. In the facility W1 illustrated in FIG. 2, a plurality of storage shelves (storage locations) where goods (to be transported) are stored are disposed. FIG. 2 illustrates an example of 16 storage shelves T1 to T16.

In addition, in the facility W1, standby points for the automatic traveling devices 2 are set. For example, in the facility W1, a standby point P1 where an AGV 1 waits, a standby point P2 where an AGV 2 waits, and a standby point P3 where an AGV 3 waits are set. Each automatic traveling device 2 waits at the predetermined standby point when the automatic traveling device 2 does not receive a transport instruction (traveling instruction) from the management server 1.

The automatic traveling system 10 is a system that performs motion according to control information when the automatic traveling device 2 detects a tag Tg (e.g., an RFID tag) with the control information (control parameters) that defines the motion of the automatic traveling device 2 in a traveling area where the tag Tg (e.g., the RFID tag) is installed. Specifically, when the automatic traveling device 2 detects the tag Tg with the aforementioned control information installed on the floor in the facility W1, the automatic traveling device 2 performs the motion according to the control information (see FIG. 4). The tags Tg are placed on the floor in the facility W1 by a user, on the basis of on the aforementioned traveling route. For example, in FIG. 2, a dotted line indicates a traveling route along which the automatic traveling devices 2 can travel, and the tags Tg are each installed at a predetermined intersection of the traveling route. The RFID tags are an example of the tags of the present disclosure. A magnetic tape for traveling guide may be installed along the traveling route. In this case, the automatic traveling device 2 travels along the magnetic tape, detects the tag Tg installed on the magnetic tape L, and performs the motion according to the control information.

Figure 3:
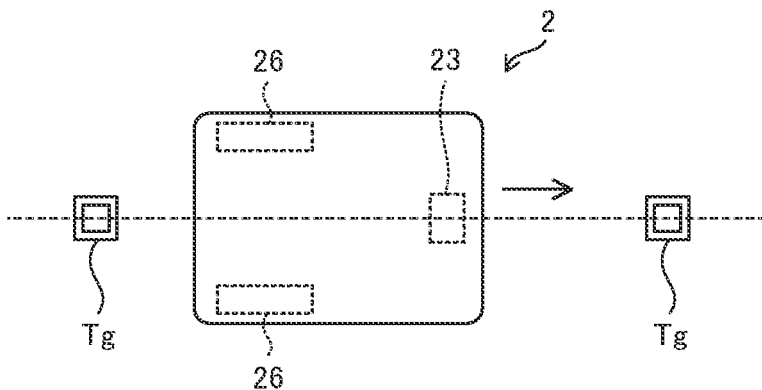
FIG. 3 is a diagram illustrating an example of a configuration of tags and an automatic traveling device according to the embodiment of the present disclosure.

The management server 1 has a function to manage operation of the automatic traveling devices 2 (operation management function) and a function to manage a status of the tags Tg (tag management function). The management server 1 may be composed of a plurality of server devices, and the server device having the operation management function and the server device having the tag management function may be provided separately. The automatic traveling devices 2 each have a self-position estimation function and periodically transmit self-position information representing its own position and tag Tg detection information to the management server 1. The automatic traveling system 10 is provided with an abnormality detection function to detect an abnormality of the tag Tg.
Automatic Traveling Device 2
As illustrated in FIG. 1, the automatic traveling devices 2 each include a controller 21, a storage 22, a tag sensor 23, a Lidar sensor 24, a communicator 25, and the like. FIG. 3 schematically illustrates the tags Tg installed on the floor of the facility W1 and the automatic traveling device 2 which travels in the facility W1.

The communicator 25 is a communication interface for wirelessly connecting the automatic traveling device 2 to the communication network N1 and executing data communication according to a predetermined communication protocol with an external device such as the management server 1 via the communication network N1.

The automatic traveling device 2 includes driving wheels 26, an encoder for measuring the angle of rotation of the driving wheels 26, a coupler for coupling a platform truck, a motor, a battery, and the like (not illustrated). The automatic traveling device 2 drives a motor with battery power, and rotates the driving wheels 26 with motor's driving force to travel. The battery is a rechargeable battery and is charged by an automatic charger. For example, the automatic traveling device 2 can charge the battery with a charger at a predetermined charging position while traveling along a set traveling route. The coupler is a coupling tool that couples the platform truck to the automatic traveling device 2. The automatic traveling device 2 can couple the platform truck by the coupler at the predetermined coupling position while traveling along the set traveling route, and travel while towing the platform truck.

The Lidar sensor 24 is a distance sensor (distance measuring device) that can measure a distance to an obstacle three-dimensionally using a laser beam. Specifically, the LIDAR sensor 24 uses a mirror and a Micro Electro Mechanical System (MEMS) to irradiate a surrounding area with a laser beam while receiving reflected light and measuring time difference between irradiation and reception to measure a distance to an obstacle in the direction of laser irradiation. At this time, by repeating the direction of laser beam irradiation in a fixed pattern, the placement of an obstacle in space can be observed at a frequency of several 10 Hz.

The tag sensor 23 detects the tags Tg installed on the floor of the traveling area (facility W1). As illustrated in FIG. 3, the tag sensor 23 is provided at such a position as to be able to face the tag Tg when the automatic traveling device 2 travels. For the tag sensor 23, an RFID sensor that corresponds to the RFID tag used as the tag Tg and is capable of communicating with the RFID tag is used. The tag sensor 23 may be provided at such a position as to be deviated from the position facing the tag Tg, as long as communication with the tag Tg is possible. The tag sensor 23 can be changed as appropriate in accordance with the type of a communication tag used as the tag Tg.

Identification information (such as a tag number and a tag ID) of the tag Tg is recorded on the tag Tg in a readable form. For example, the tag sensor 23 detects the tag Tg installed on the floor to acquire the tag number recorded on the tag Tg. Specifically, the tag sensor 23 communicates with the tag Tg while the automatic traveling devices 2 is traveling, so that the tag sensor 23 acquires the tag number recorded on the tag Tg.

By using the communication tag such as the RFID tag as the tag Tg, communication can be performed between the tag sensor 23 and the tag Tg for a predetermined period of time (longer than a period during which the tag sensor 23 faces the tag Tg) while the target tag passes in the vicinity of the tag Tg. Therefore, the tag number recorded on the tag Tg can be accurately acquired even when the automatic traveling device 2 is traveling. The controller 21 acquires the tag number from the tag sensor 23.

The storage 22 is a non-volatile storage such as a hard disk drive (HDD) and a solid state drive (SSD) that store various types of information. The storage 22 stores data such as control information D1.

FIG. 4 is a diagram illustrating an example of the control information D1. The control information D1 is information that defines the traveling motion of the automatic traveling devices 2. As illustrated in FIG. 4, the control information D1 includes information such as "motion order", "tag number", "traveling motion", "speed", "traveling distance", "specific motion". The motion order is information indicating the order of the traveling motion of the automatic traveling device 2. In the example illustrated in FIG. 4, the automatic traveling device 2 performs traveling motion in the order from No. 1 to No. 10. The tag number is the identification information of the tag Tg and corresponds to the tag number recorded on the tag Tg. A tag ID may be registered in the control information D1 instead of the aforementioned tag number.

The traveling motion is information that represents motion to be performed by the automatic traveling device 2. The "advance" represent motion to cause the automatic traveling device 2 to travel forward. The "right spin" represents motion to cause the automatic traveling device 2 to turn the right (spin turn). The "right following" represents motion to increase the response speed of the turning control to travel smoothly around a curve to the right. The "center following" represents motion to reduce the response speed of the turning control to suppress meandering and to travel straight. The "stop" represents motion to cause the automatic traveling device 2 to stop.

The speed is information of the traveling speed of the automatic traveling device 2. The specific motion is information representing specific motion to be performed by the automatic traveling device 2. The control information D1 may include acceleration information and deceleration information. The traveling distance is information on a distance that the automatic traveling device 2 is to travel. For example, the automatic traveling device 2 advances by a traveling distance L2 when detecting a tag Tg2 (tag number "2"), and advances by a traveling distance L3 when detecting a tag Tg3 (tag number "3"). The traveling distance L2 is set to a distance from a tag Tg2 to the tag Tg3. In other words, each traveling distance L2 is set to a distance according to an interval between the two adjacent tags Tg. The specific motion includes charging motion to charge the automatic traveling device 2, coupling motion to couple an object (for example, a platform truck) to be coupled to the automatic traveling device 2.

In the control information D1, each of the motion order, the traveling motion, the speed, the traveling distance, and the specific motion are registered in association with the tag number. The control information D1 illustrated in FIG. 4 is an example and is not limited to this. The control information D1 is set in the management server 1, an operation terminal (not illustrated), and the like, and output (transferred) to each automatic traveling device 2. When the automatic traveling device 2 acquires the control information D1, the automatic traveling device 2 stores the control information D1 in the storage 22, and travels along the set traveling route while performing traveling motion according to the control information D1.

In addition, the storage 22 stores a control program for causing the controller 21 to perform various control processes. For example, the control program is non-temporarily recorded on a computer-readable recording medium such as a CD and a DVD, is read by a reading device (not illustrated) provided by the automatic traveling device 2 and stored in the storage 22. The control program may be delivered from a cloud server and stored in the storage 22.

The controller 21 has control devices such as a CPU, a ROM, and a RAM. The CPU is a processor that executes various types of calculation processes. The ROM is a non-volatile storage that stores, in advance, control programs such as a BIOS and an OS for causing the CPU to execute the various types of calculation processes. The RAM is a volatile or non-volatile storage that stores various types of information, and is used as a temporary storage memory (work area) for various processes to be executed by the CPU. The controller 21 controls the automatic traveling devices 2 by executing various control programs stored in advance in the ROM or the storage 22 by the CPU.

Specifically, the controller 21 includes various processors such as an estimation processor 211, an acquisition processor 212, and a motion processor 213, as illustrated in FIG. 1. The controller 21 executes various types of processes according to the control program in the CPU to function as various types of the processors described above. Some or all of the processors may be composed of an electronic circuit.

The control program may be a program that causes a plurality of processors to function as the processor described above.

The estimation processor 211 estimates a self-position of the automatic traveling device 2. Specifically, the estimation processor 211 estimates the self-position on a map by using a well-known self-position estimation method. For example, the estimation processor 211 estimates the position of the automatic traveling device 2 on an obstacle map by acquiring a measurement result of the Lidar sensor 24 and matching the placement of an obstacle corresponding to the measurement result against the known obstacle map. The estimation processor 211 transmits the estimated position information (self-position information) to the management server 1.

As another embodiment, the estimation processor 211 may use a camera (not illustrated) instead of the Lidar sensor 24 to perform self-position estimation. For example, the estimation processor 211 calculates the self-position of the automatic traveling device 2 by estimating camera movement from the movement of a feature point in each frame of a video image captured by the camera.

The acquisition processor 212 acquires the control information D1 (see FIG. 4) from the management server 1. When the acquisition processor 212 acquires the control information D1, the acquisition processor 212 stores the control information D1 in the storage 22.

When the tag sensor 23 detects a tag Tg, the motion processor 213 causes the automatic traveling device 2 to perform the traveling motion corresponding to the tag Tg. Specifically, when the tag sensor 23 detects the tag Tg and reads the tag number recorded on the tag Tg, the motion processor 213 refers to the control information D1 (see FIG. 4) to cause execution of the traveling motion associated with this tag number. The motion processor 213 also transmits the detection information (e.g., the detection position) of the tag Tg to the management server 1.

Figure 5:
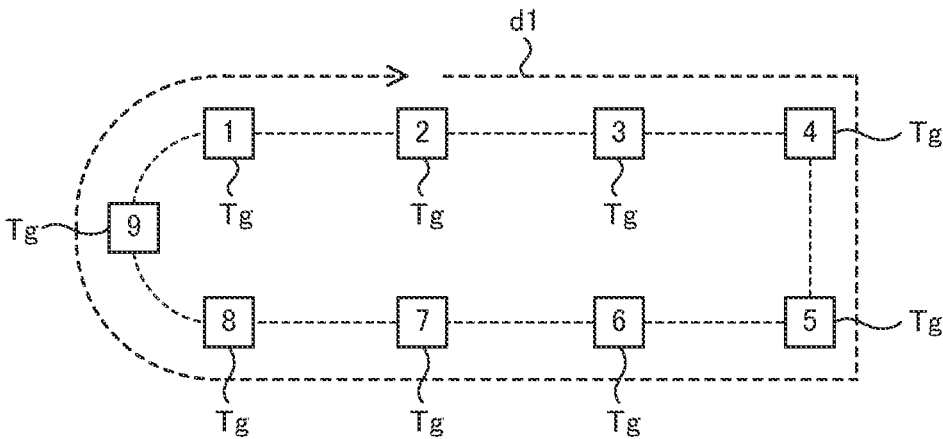
FIG. 5 is a diagram illustrating an example of a traveling route of the automatic traveling device according to the embodiment of the present disclosure.

FIG. 5 illustrates a specific example of a traveling route corresponding to the control information D1 illustrated in FIG. 4. When a user sets the traveling route and the control information D1 on the management server 1, the user installs RFID tags corresponding to the tags Tg on the floor of the facility W1 on the basis of the set traveling route. When the user inputs a traveling instruction to the management server 1, the automatic traveling device 2 starts traveling from a position of the tag number "2" (starting point), proceeds in the arrow direction d1, and stops at a position of the tag number "2" (ending point).

Specifically, when the automatic traveling device 2 first detects the tag Tg with tag number "2", the automatic traveling device 2 advances at a speed of 10 m/min by the traveling distance L2, and when the automatic traveling device 2 detects the following tag Tg with tag number "3", the automatic traveling device 2 changes the speed to a speed of 30 m/min and advances by the traveling distance L3. The automatic traveling device 2 then turns to the right and advances by a traveling distance L4 when detecting a tag Tg with tag number "4", and turns further to the right and advances by a traveling distance L5 when detecting a following tag Tg with tag number "5". The automatic traveling device 2 then changes the speed to 10 m/min and advances by a traveling distance L6 when detecting a tag Tg with tag number "6", and pauses and performs the charging motion when detecting a following tag Tg with tag number "7". When the automatic traveling device 2 finishes the charge motion, the automatic traveling device 2 advances by a traveling distance L7, and when the automatic traveling device 2 detects a tag Tg with tag number "8", the automatic traveling device 2 switches to traveling control suitable for turning right, changes the speed to 20 m/min, and turns by a traveling distance L8. When the automatic traveling device 2 detects a tag Tg with tag number "9", the automatic traveling device 2 continues the traveling control suitable for turning right and turns by a traveling distance L9, and when the automatic traveling device 2 detects a following tag Tg with tag number "1", the automatic traveling device 2 switches to traveling control suitable for traveling straight ahead and advances by a traveling distance L1. Finally, the automatic traveling device 2 stops when the automatic traveling device 2 detects tag number "2" and performs a coupling motion to couple to a platform truck.

As described above, the automatic traveling device 2 performs autonomous traveling on the basis of the set traveling route and the control information D1. The automatic traveling device 2 periodically transmits the self-position information representing the self-position and the detection information of the tag Tg to the management server 1. The management server 1 acquires the self-position information and the detection information from each automatic traveling device 2 to manage the traveling status of each automatic traveling device 2.

Management Server 1

As illustrated in FIG. 1, the management server 1 is a server that includes a controller 11, a storage 12, an operation display 13, and a communicator 14. The management server 1 is not limited to a single computer, but may be a computer system in which a plurality of computers operate in cooperation with each other. Various processes performed by the management server 1 may be distributed and executed by one or more processors.

The communicator 14 is a communication interface for connecting the management server 1 to the communication network N1 by wired or wirelessly and for executing data communication according to a predetermined communication protocol with a plurality of the automatic traveling devices 2 via the communication network N1.

The operation display 13 is a user interface including a display, such as a liquid crystal display and an organic EL display, that displays various types of information, and an operation acceptor, such as a mouse, a keyboard, and a touch panel, that accepts operation.

The storage 12 is a non-volatile storage, such as an HDD and an SSD, that stores various types of information. Specifically, the storage 12 stores data such as the aforementioned self-position information and the aforementioned detection information received from each automatic traveling device 2. In addition, the storage 12 stores information (operation information) regarding operation instructions (such as a destination and a traveling route) to be transmitted to each automatic traveling device 2.

In addition, the storage 12 stores control programs such as an automatic traveling program to cause the controller 11 to perform the automatic traveling process (see FIG. 10) described below. For example, the automatic traveling program is non-temporarily recorded on a computer-readable recording medium such as a CD and a DVD, and is read by a reading device (not illustrated) such as a CD drive and a DVD drive provided by the management server 1 and stored in the storage 12.

The controller 11 has control devices such as a CPU, a ROM, and a RAM. The CPU is a processor that executes various types of calculation processes. The ROM is a non-volatile storage that stores, in advance, control programs such as a BIOS and an OS for causing the CPU to execute the various types of calculation processes. The RAM is a volatile or non-volatile storage that stores various types of information, and is used as a temporary storage memory (work area) for various processes to be executed by the CPU. The controller 11 controls the management server 1 by causing the CPU to execute various types of control programs stored in advance in the ROM or the storage 12.

Specifically, the controller 11 includes various processors such as an acquisition processor 111, a determination processor 112, and a traveling processor 113, as illustrated in FIG. 1. The controller 11 functions as the aforementioned various processors by executing various processes according to the aforementioned automatic traveling program with the aforementioned CPU. Some or all of the processors may be composed of an electronic circuit. The automatic traveling program may be a program for causing a plurality of processors to function as the processors.

The acquisition processor 111 acquires the self-position information and the detection information (such as a measurement result of the tag sensor 23) from each automatic traveling device 2.

The determination processor 112 determines the status of the tag Tg on the basis of the self-position information and the detection information. Specifically, the determination processor 112 determines, on the basis of the plurality of the detection information acquired by the acquisition processor 111, whether or not the automatic traveling device 2 successfully reads the tag Tg at a position where the tag Tg is installed while traveling. Herein, reading errors (skipping) may occur due to tag abnormalities caused by damage, age-related deterioration, or misalignment of tags Tg, or environmental conditions when tags Tg are read. The determination processor 112 determines whether or not the tag Tg is successfully read, on the basis of the self-position information and the detection information.

The traveling processor 113 controls the traveling of the automatic traveling device 2 on the basis of a determination result of the determination processor 112. Specifically, in a case where the determination processor 112 determines that automatic traveling devices 2 does not succeed (fails) in reading the target tag Tg, the traveling processor 113 controls the traveling of the target tag Tg on the basis of the information of a first connection route connecting an installation position of the tag Tg immediately before the target tag Tg that is determined not to be read successfully to an installation position of the target tag Tg, and a second connection route connecting an installation position of the target Tg to an installation position of the tag Tg immediately after the target tag Tg. For example, in a case where the traveling processor 113 determines that the target tag Tg is not read successfully, and the first connection route and the second connection route are on the same straight line, the automatic traveling devices 2 is caused to advance toward the installation position of a next tag Tg.

Figure 6:
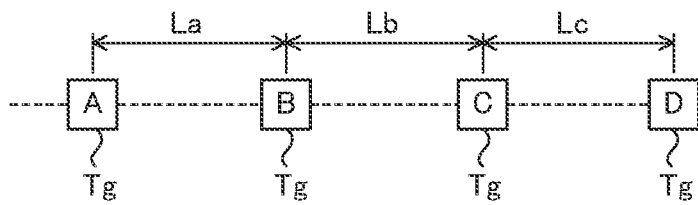
FIG. 6 is a diagram illustrating a reading example of tags of the automatic traveling device according to the embodiment of the present disclosure.

FIG. 6 illustrates an example of four tags TgA to TgD. In a case where the tags TgA to tag TgD are normal and the automatic traveling device 2 can read the tags TgA to TgD normally, the automatic traveling device 2 travels straight for a traveling distance La when reading the tag TgA, the automatic traveling device 2 travels straight for a traveling distance Lb when reading the next tag TgB, the automatic traveling device 2 travels straight for a distance Lc when reading the next tag TgC, the automatic traveling device 2 travels straight ahead by a traveling distance Lc, and the automatic traveling device 2 stops when reading the last tag TgD.

Figure 7:
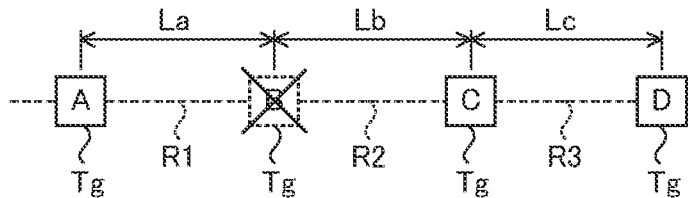
FIG. 7 is a diagram illustrating a reading example of the tags of the automatic traveling device according to the embodiment of the present disclosure.

Herein, as illustrated in FIG. 7, in a case where there is an abnormality in the tag TgB, the automatic traveling device 2 cannot read the tag TgB normally. In this case, in the conventional technology, the automatic traveling device 2 stops traveling at the tag TgB position, which interrupts transport operation and reduces transport efficiency.

In contrast, in the automatic traveling system 10 according to this embodiment, the traveling processor 113 executes a process of allowing the automatic traveling device 2 to continue traveling even when the automatic traveling device 2 is unable to read the tag TgB.

Specifically, in a case where the automatic traveling device 2 does not succeed (fails) in reading the tag TgB at the position where the automatic traveling device 2 has successfully read the tag TgA and traveled straight ahead by the traveling distance L1, the traveling processor 113 controls the traveling of the automatic traveling device 2 on the basis of information on a connection route R1 connecting the installation position of the tag TgA immediately before the tag TgB and the installation position of the tag TgB, a connection route R2 connecting the installation position of the tag TgC immediately after the tag TgB and the installation position of the tag TgB.

For example, in a case where it is determined that the determination processor 112 fails in reading the tag TgB, and the connection route R1 and the connection route R2 are on the same straight line, the traveling processor 113 causes the automatic traveling device 2 to travel straight toward the installation position of the tag TgC. In this case, the traveling processor 113 causes the automatic traveling device to travel straight ahead by a traveling distance Lb associated with the tag TgB failed to be read. When the automatic traveling device 2 successfully reads the next tag TgC at the position where the automatic traveling device 2 has traveled straight ahead by the traveling distance Lb, the automatic traveling device 2 travels straight ahead by a traveling distance Lc.

Thus, in a case where the tag TgA, the tag TgB, and the tag TgC are linearly arranged side by side, the controller 11 executes a process of allowing the automatic traveling device 2 to continue traveling even when the automatic traveling device 2 fails in reading the tag TgB, because an influence on traveling accuracy by skipping the tag TgB is small. Consequently, the automatic traveling device 2 can continue traveling even when the automatic traveling device 2 does not succeed in reading the tag Tg, and therefore it is possible to suppress the decrease in transport efficiency.

In the above example (see FIG. 7), the traveling processor 113 causes the automatic traveling device 2 to travel straight ahead by the traveling distance Lb associated with the tag TgB failed to be read, and in a case where the automatic traveling device 2 does not also successfully read the next tag TgC at the position where the automatic traveling device 2 has traveled straight ahead by the traveling distance Lb, the automatic traveling device 2 is caused to stop. In other words, in a case where the automatic traveling device 2 fails in reading the two tags Tg consecutively, the traveling accuracy may decrease and positional deviation from the traveling route may increase, and therefore the traveling processor 113 causes the automatic traveling device 2 to stop at the position of the second read error tag Tg (tag TgC in this case).

Figure 8:
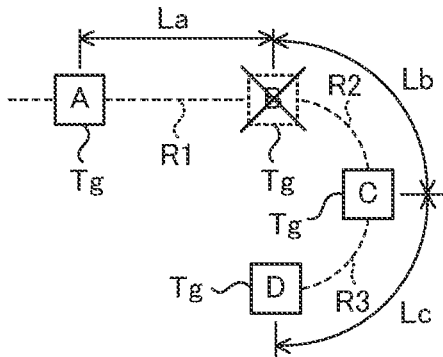
FIG. 8 is a diagram illustrating a reading example of the tags of the automatic traveling device according to the embodiment of the present disclosure.

In a case where the determination processor 112 determines that the target tag Tg is not successfully read, and the first connection route and the second connection route are not on the same straight line, the traveling processor 113 causes the automatic traveling device 2 to stop. For example, as illustrated in FIG. 8, in a case where the connection route R1 connecting the tag TgA to the tag TgB, the connection route R2 connecting the tag TgB to the tag TgC are not on the same straight line, when the determination processor 112 determines that the target tag TgB is not successfully read, the traveling processor 113 causes the automatic traveling device 2 to stop at the position of the tag TgB. Consequently, it is possible to prevent the decrease in traveling accuracy and the increase in positional deviation from the traveling route.

As another embodiment, in a case where the determination processor 112 determines that the target tag Tg is not successfully read, and the target tag Tg is set with control information that defines motion to change the traveling direction of the automatic traveling device 2, and the automatic traveling device 2 fails in reading the tag TB, the traveling processor 113 may cause the automatic traveling devices 2 to stop. In the example illustrated in FIG. 8, in a case where the tag TgB is set with the "right spin" traveling motion to change the traveling direction in the control information D1 (see FIG. 4), the traveling processor 113 stops the automatic traveling device 2 at the position of the tag TgB when the automatic traveling device 2 has failed to read the tag TgB.

In a case where the determination processor 112 determines that the target tag Tg is not successfully read, and the first connection route and the second connection route are on the same curved line, the traveling processor 113 may cause the automatic traveling devices 2 to turn and travel toward the installation position of the next tag Tg at the same steering angle as the steering angle in turning along the first connection route. For example, as illustrated in FIG. 9, in a case where the automatic traveling device 2 fails in reading the tag TgC at the position where the automatic traveling device 2 has successfully read the tag TgB and turned by the traveling distance Lb, and the connection route R2 connecting the tag TgB to the tag TgC and a connection route R3 connecting the tag TgC to the tag TgD are on the same curved line (same radius of curvature), the traveling processor 113 turns along the connection route R3 by the traveling distance Lc toward the installation position of the tag TgD at the same steering angle as the steering angle in turning along the connection route R2.

Figure 9:
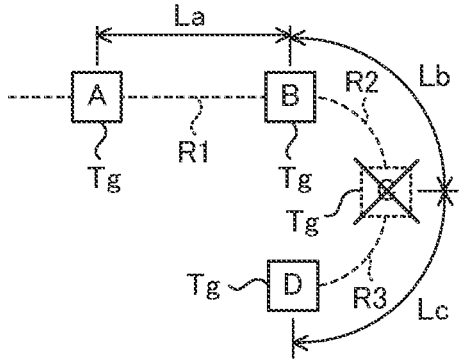
FIG. 9 is a diagram illustrating a reading example of the tags of the automatic traveling device according to the embodiment of the present disclosure.

In the example illustrated in FIG. 9, in a case where the connection route R2 and the connection route R3 are not on the same curved line, the traveling processor 113 causes the automatic traveling device 2 to stop at the position where the tag TgC is installed, in order to prevent the decrease in the traveling accuracy of the automatic traveling device 2.

When the automatic traveling device 2 is stopped due to a tag Tg reading error, the controller 11 may also notify an abnormality of the tag Tg. For example, the controller 11 displays error information including information indicating the position of the tag Tg failed to be read, on the operation display 13 of the management server 1 or the user's operation terminal. The controller 11 may also output an error sound from the automatic traveling device 2, or turn on or flash an indicator light mounted on the automatic traveling device 2.

Automatic Traveling Process

Figure 10:
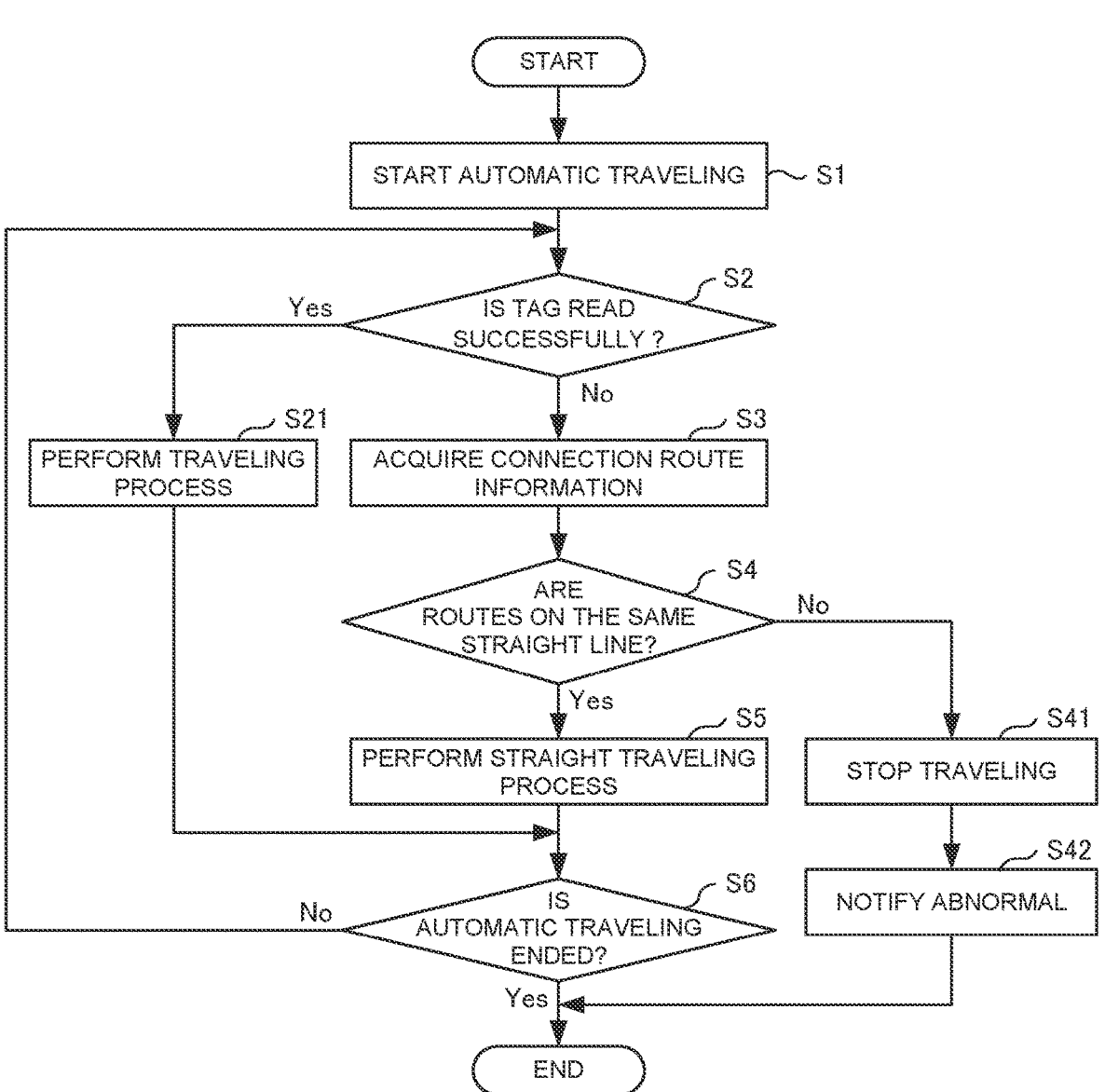
FIG. 10 is a flowchart illustrating an example of a procedure of an automatic traveling process executed by the automatic traveling system according to the embodiment of the present disclosure.

Hereinafter, an automatic traveling process executed by the automatic traveling system 10 will be described with reference to FIG. 10. Specifically, in this embodiment, the automatic traveling process is executed by the controller 11 of the management server 1. The controller 11 is capable of executing a plurality of automatic traveling processes in parallel in response to a plurality of transport requests. When the controller 11 starts traveling of the automatic traveling device 2 in response to the transport request (traveling instruction), the controller 11 executes the automatic traveling process illustrated in FIG. 10.

The present disclosure can be taken as disclosure of an automatic traveling method for executing one or more steps included in the above automatic traveling process. In addition, one or more steps included in the aforementioned automatic traveling process described herein may be omitted as appropriate. The order of execution of each step in the automatic traveling process may differ to such an extent as to generate similar effects. Furthermore, although the case where the controller 11 executes each step in the automatic traveling process is described herein as an example, an automatic traveling method in which one or more processors execute each step in the automatic traveling process in a distributed manner is also considered as another possible embodiment.

First, in Step S1, the controller 11 causes the automatic traveling device 2 to start automatic traveling. Specifically, the controller 11 outputs the preset traveling route information and control information D1 (see FIG. 4) to the automatic traveling device 2 to start traveling.

Next, in Step S2, the controller 11 determines whether or not the automatic traveling device 2 successfully reads the tag Tg at the position of the tag Tg while traveling. Specifically, the controller 11 determines whether or not the automatic traveling device 2 succeeds or fails in reading the tag Tg on the basis of the self-position information and the detection information (such as measurement results by the tag sensor 23) acquired from the automatic traveling device 2. When the controller 11 determines that the automatic traveling device 2 successfully reads the tag Tg at the position where the tag Tg is installed while traveling (Yes in S2), the process is shifted to Step S21. On the other hand, when the controller 11 determines that the automatic traveling device 2 does not succeed (fail) in reading the tag Tg at the position where the tag Tg is installed while traveling (No in S2), the process is shifted to Step S3.

In Step S21, the controller 11 causes the automatic traveling device 2 to perform predetermined motion on the basis of the control information D1 (see FIG. 4) associated with the read tag Tg. After Step S21, the controller 11 shifts the process to Step S6.

On the other hand, in Step S3, the controller 11 acquires information on the connection route corresponding to the target tag Tg failed to be read. For example, in the example illustrated in FIG. 7, when the controller 11 determines that the automatic traveling device 2 fails in reading the tag TgB, the controller 11 acquires information on the connection route R1 connecting the installation position of the tag TgA immediately before the tag TgB to the installation position of the tag TgB and the connection route R2 connecting the installation position of the tag TgC immediately after the tag TgB to the installation position of the tag TgB.

Next, in Step S4, the controller 11 determines whether or not the connection route R1 and the connection route R2 acquired in Step S3 are on the same line. In other words, the controller 11 determines whether or not the three tags Tg, including the target tag Tg and the tags Tg before and after the target tag Tg, are arranged side by side linearly.

In the example illustrated in FIG. 7, the controller 11 determines whether or not the connection route R1 and the connection route R2 are on the same line, or whether or not the tags TgA, TgB, and TgC are arranged side by side linearly. The tag TgB is installed at a distance of the traveling distance La from the tag TgA, and the tag TgC is installed at a distance of the traveling distance Lb from the tag TgB.

When it is determined that the connection route R1 and the connection route R2 are on the same straight line (Yes in S4), the controller 11 shifts the process to Step S5. On the other hand, when the controller 11 determines that the connection route R1 and the connection route R2 are not on the same line (No in S4), the process is shifted to Step S41.

In Step S5, the controller 11 causes the automatic traveling devices 2 to travel straight ahead. Specifically, the controller 11 assumes that the automatic traveling device 2 has read the tag TgB at the position of the tag TgB and causes the automatic traveling device 2 to travel straight ahead by the traveling distance Lb associated with the tag TgB (see FIG. 7). Consequently, the automatic traveling device 2 continue traveling to the next tag TgC without stopping at the tag TgB failed to be read.

Next, in Step S6, the controller 11 determines whether or not the automatic traveling is completed. For example, the controller 11 determines that automatic traveling is ended when the automatic traveling device 2 arrives at a travel end position. When the controller 11 determines that the automatic traveling is completed (Yes in S6), the automatic traveling process is ended On the other hand, when the controller 11 determines that automatic traveling is not completed (No in S6), the process is shifted to Step S2. For example, when the automatic traveling device 2 arrives at a target position, the controller 11 determines that the automatic traveling is completed and terminates the automatic traveling process. The controller 11 repeats the process of Steps S2 to S5 until the automatic traveling device 2 arrives at the target position (No in S6).

On the other hand, in Step S41, the controller 11 causes the automatic traveling devices 2 to stop traveling. For example, as illustrated in FIG. 8, when it is determined that the connection route R1 and the connection route R2 are not on the same straight line (No in S4), the automatic traveling devices 2 is caused to stop at the position of the tag TgB. Thereafter, in Step S42, the controller 11 notifies the abnormality of the tag Tg. For example, the controller 11 displays error information including information indicating the position of the tag TgB failed to be read on the operation display 13 of the management server 1 or the user's operation terminal. After Step S42, the controller 11 terminates the automatic traveling process. In this case, for example, a user checks the error information and performs predetermined work such as repairing or replacing of the tag Tg and maintenance of the automatic traveling device 2.

As described above, the controller 11 autonomously travels along the traveling route on the basis of the control information associated with the tag Tg (see FIG. 4) while the automatic traveling device 2 successfully reads the tag Tg on the traveling route (Yes in S2, S21), and when the automatic traveling device 2 fails in reading the tag Tg, the automatic traveling device 2 can continue traveling (Yes in S4, S5) or stop traveling (No in S4, S41) on the basis of the information on the connection route.

The controller 11 also executes the automatic traveling process for each automatic traveling device 2 which exist in the traveling area (facility W1).

As described above, the automatic traveling system 10 according to this embodiment is a system that causes the automatic traveling device 2 to travel by sequential movement of the automatic traveling device 2 to the position of each of the plurality of tags Tg in a specified order and reading of each of the tags Tg by the automatic traveling device 2, in the traveling area where a plurality of the tags Tg are installed corresponding to a plurality of the respective installation positions.

The automatic traveling system 10 determines whether or not the automatic traveling device 2 successfully reads the target tag Tg at the position of the target tag Tg while traveling, and controls traveling of the automatic traveling device 2 on the basis of information on the first connection route connecting the installation position of the first tag Tg immediately before the target tag Tg that is determined not to be successfully read to the installation position of the target tag Tg, and the second connection route connecting the installation position of the second tag Tg immediately after the target tag Tg to the installation position of the target tag Tg, in a case where it is determined that the target tag Tg is not successfully read.

For example, in a case where the target tag Tg is determined not to be successfully read, and the first connection route and the second connection route are on the same straight line, the automatic traveling system 10 causes the automatic traveling device 2 to travel straight ahead toward the installation position of the second tag Tg.

According to the above configuration, even in a case where the reading error of the tag Tg occurs, the automatic traveling device 2 can be caused to continue traveling without stopping. Therefore, it is possible to suppress decrease in transport efficiency by the automatic traveling device 2 since the transport operation is not interrupted.

APPENDIX OF DISCLOSURE

The outline of the disclosure extracted from the above embodiment will be hereinafter appended. Each configuration and each processing function described in the appendixes below can be selected and combined arbitrarily.

Appendix 1

An automatic traveling system that causes an automatic traveling device to travel by sequential movement of the automatic traveling device to a position of each of a plurality of tags in a specified order and reading of each of the tags by the automatic traveling device, in a traveling area where a plurality of the tags are installed corresponding to a plurality of respective installation positions, the automatic traveling system comprising:

a determination processor that determines whether or not the automatic traveling device successfully reads a target tag at a position of the target tag while traveling; and a traveling processor that controls traveling of the automatic traveling device on the basis of information on a first connection route connecting an installation position of a first tag immediately before the target tag that is determined not to be successfully read to an installation position of the target tag, and a second connection route connecting an installation position of a second tag immediately after the target tag to the installation position of the target tag, in a case where the determination processor determines that the target tag is not successfully read.

Appendix 2

The automatic traveling system described in appendix 1, wherein in a case where the determination processor determines that the target tag is not successfully read, and the first connection route and the second connection route are on the same straight line, the traveling processor causes the automatic traveling device to travel straight ahead toward the installation position of the second tag.

Appendix 3

The automatic traveling system described in appendix 2, wherein in a case where the traveling processor causes the automatic traveling device to further travel straight ahead toward the installation position of the second tag, and the determination processor determines that the second tag is not successfully read, the traveling processor causes the automatic traveling device to stop.

Appendix 4

The automatic traveling system described in appendix 2 or 3, wherein in a case where the determination processor determines that the target tag is not successfully read, and the first connection route and the second connection route are not on the same straight line, the traveling processor causes the automatic traveling device to stop.

Appendix 5

The automatic traveling system described in any of appendixes 2 to 4, wherein in a case where the determination processor determines that the target tag is not successfully read, and the target tag is set with control information that defines motion to change a traveling direction of the automatic traveling device, the traveling processor causes the automatic traveling device to stop.

Appendix 6

The automatic traveling system described in any of appendixes 1 to 5, wherein in a case where the determination processor determines that the target tag is not successfully read, and the first connection route and the second connection route are on the same curved line, the traveling processor causes the automatic traveling device to turn toward the installation position of the second tag at a steering angle that is the same as a steering angle in turning along the first connection route.

Appendix 7

The automatic traveling system described in any of appendixes 1 to 6, wherein in a case where the automatic traveling device is caused to stop, an abnormality of the target tag is notified.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An automatic traveling system that causes an automatic traveling device to travel, using a sequential movement of the automatic traveling device, to a position of each of a plurality of tags in a specified order and to read each of the plurality of tags in a traveling area where the plurality of tags is installed corresponding to a plurality of respective installation positions, a traveling distance corresponding to each of the plurality of tags being stored in a storage, the automatic traveling system comprising:

a first determination circuit that determines whether the automatic traveling device successfully reads a target tag, among the plurality of tags, at a position of the target tag while traveling;

a second determination circuit that determines, in a case that the first determination circuit determines that the target tag is not successfully read, whether a first connection route and a second connection route are on a same straight line based on:

information on the first connection route connecting an installation position of a first tag, immediately before the target tag that is determined not to be successfully read, to an installation position of the target tag, and information on the second connection route connecting an installation position of a second tag, immediately after the target tag, to the installation position of the target tag; and a traveling circuit that, in a case that the first determination circuit determines that the target tag is not successfully read:

causes the automatic traveling device to travel straight ahead toward the installation position of the second tag a first traveling distance, corresponding to the target tag and stored in the storage, when the second determination circuit determines that the first connection route and the second connection route are on the same straight line, causes the automatic traveling device to stop when the first determination circuit further determines that the second tag is not successfully read after traveling the first traveling distance, and causes the automatic traveling device to stop at the position of the target tag when the second determination circuit determines that the first connection route and the second connection route are not on the same straight line.

2. The automatic traveling system according to claim 1, wherein in a case that the first determination circuit determines that the target tag is not successfully read, and that the target tag is set with control information that defines a motion to change a traveling direction of the automatic traveling device, the traveling circuit further causes the automatic traveling device to stop.

3. The automatic traveling system according to claim 1, wherein in a case that the first determination circuit determines that the target tag is not successfully read, and that the second determination circuit determines that the first connection route and the second connection route are on a same curved line, the traveling circuit further causes the automatic traveling device to turn toward the installation position of the second tag at a steering angle that is the same as a steering angle in turning along the first connection route.

4. The automatic traveling system according to claim 1, wherein in a case that the automatic traveling device is caused to stop, an abnormality of the target tag is notified.

5. An automatic traveling method for causing an automatic traveling device to travel, using a sequential movement of the automatic traveling device, to a position of each of a plurality of tags in a specified order and to read each of the plurality of tags in a traveling area where the plurality of tags is installed corresponding to a plurality of respective installation positions, a traveling distance corresponding to each of the plurality of tags being stored in a storage, the automatic traveling method comprising:

determining whether the automatic traveling device successfully reads a target tag, among the plurality of tags, at a position of the target tag while traveling;

determining, in a case of determining that the target tag is not successfully read, whether a first connection route and a second connection route are on a same straight line based on:

information on the first connection route connecting an installation position of a first tag, immediately before the target tag that is determined not to be successfully read, to an installation position of the target tag, and information on the second connection route connecting an installation position of a second tag, immediately after the target tag, to the installation position of the target tag;

causing the automatic traveling device to travel straight ahead toward the installation position of the second tag a first traveling distance, corresponding to the target tag and stored in the storage, in a case of:

determining that the target tag is not successfully read, and determining that the first connection route and the second connection route are on the same straight line;

causing the automatic traveling device to stop, after traveling the first traveling distance, in a case of:

determining that the target tag is not successfully read, and determining that that the second tag is not successfully read; and causing the automatic traveling device to stop at the position of the target tag in a case of:

determining that the target tag is not successfully read, and determining that the first connection route and the second connection route are not on the same straight line.

6. A non-transitory computer-readable recording medium recording an automatic traveling program that causes an automatic traveling device to travel, using a sequential movement of the automatic traveling device, to a position of each of a plurality of tags in a specified order and to read each of the plurality of tags in a traveling area where the plurality of tags is installed corresponding to a plurality of respective installation positions, a traveling distance corresponding to each of the plurality of tags being stored in a storage, the non-transitory computer-readable recording medium recording an automatic traveling program for causing one or more processors to:

determine whether the automatic traveling device successfully reads a target tag, among the plurality of tags, at a position of the target tag while traveling;

determine, in a case of determining that the target tag is not successfully read, whether a first connection route and a second connection route are on a same straight line based on:

information on the first connection route connecting an installation position of a first tag, immediately before the target tag that is determined not to be successfully read, to an installation position of the target tag, and information on the second connection route connecting an installation position of a second tag, immediately after the target tag, to the installation position of the target tag;

cause the automatic traveling device to travel straight ahead toward the installation position of the second tag a first traveling distance, corresponding to the target tag and stored in the storage, in a case of:

determining that the target tag is not successfully read, and determining that the first connection route and the second connection route are on the same straight line;

cause the automatic traveling device to stop, after traveling the first traveling distance, in a case of:

determining that the target tag is not successfully read, and determining that the second tag is not successfully read; and cause the automatic traveling device to stop at the position of the target tag in a case of:

determining that the target tag is not successfully read, and determines that the first connection route and the second connection route are not on the same straight line.

* * * * *